US008647583B2

(12) United States Patent
Yoshioka et al.

(10) Patent No.: US 8,647,583 B2
(45) Date of Patent: Feb. 11, 2014

(54) ELECTRIC HEATING TYPE CATALYST AND A METHOD FOR MANUFACTURING THE SAME

(75) Inventors: Mamoru Yoshioka, Susono (JP); Noriaki Kumagai, Susono (JP); Naoya Takagi, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/002,264

(22) PCT Filed: Apr. 14, 2010

(86) PCT No.: PCT/JP2010/056703
§ 371 (c)(1),
(2), (4) Date: Dec. 30, 2010

(87) PCT Pub. No.: WO2011/128996
PCT Pub. Date: Oct. 20, 2011

(65) Prior Publication Data
US 2013/0022513 A1   Jan. 24, 2013

(51) Int. Cl.
*B01D 50/00* (2006.01)
(52) U.S. Cl.
USPC ............................................ 422/174; 422/179
(58) Field of Classification Search
USPC ............... 422/176, 177, 179, 180; 60/299
See application file for complete search history.

(56) References Cited

U.S. PATENT DOCUMENTS

| | | | |
|---|---|---|---|
| 3,964,875 A * | 6/1976 | Chang et al. | 422/176 |
| 4,002,433 A * | 1/1977 | Oser | 422/176 |
| 5,916,134 A * | 6/1999 | Yang et al. | 60/299 |
| 6,613,296 B1 * | 9/2003 | Myers et al. | 422/179 |
| 2008/0178582 A1 * | 7/2008 | Chang | 60/299 |
| 2010/0154396 A1 * | 6/2010 | Hahnl et al. | 60/320 |
| 2013/0011305 A1 | 1/2013 | Murata et al. | |

FOREIGN PATENT DOCUMENTS

| | | |
|---|---|---|
| JP | 05-269387 A | 10/1993 |
| JP | 11-062562 A | 3/1999 |
| JP | 2009-235931 A | 10/2009 |
| WO | 2009/118986 A1 | 10/2009 |
| WO | 2011/121710 A1 | 10/2011 |

* cited by examiner

*Primary Examiner* — Tom Duong
(74) *Attorney, Agent, or Firm* — Sughrue Mion, PLLC

(57) ABSTRACT

Electricity is suppressed from flowing to a case (2) of an electric heating type catalyst (1). The electric heating type catalyst (1) is provided with a heat generation element (4) to be electrically energized to generate heat, the case (2) in which the heat generation element (4) is received, and a mat (3) inserted between the heat generation element (4) and the case (2) for insulating electricity, wherein the case (2) is formed into double pipes (24) at an upstream side and downstream side of the heat generation element (4), respectively, and an inner pipe (28) of each of the double pipes (24) is formed such that it is in contact at an upstream side or downstream side one end (25) thereof with an outer pipe (27) of each double pipe (24), with a gap being formed between the inner pipe (28) and the outer pipe (27) of each double pipe (24) at an upstream side or downstream side other end (26) of the inner pipe (28), and an insulating layer (6) for insulating electricity is provided on a surface of the case (2) from the mat (3) to the other end (26) including a range surrounded by the outer pipe (27) and the inner pipe (28) of each double pipe (24).

7 Claims, 13 Drawing Sheets

ELECTRIC HEATING TYPE CATALYST AND A METHOD FOR MANUFACTURING THE SAME

TECHNICAL FIELD

The present invention relates to an electric heating type catalyst and a method for manufacturing the same.

BACKGROUND ART

There has been known a technique in which a mat made of an insulating material is arranged between a carrier for a catalyst which is electrically energized to generate heat and a case in which the catalyst carrier is received (for example, see a first patent document). According to this mat, when the catalyst carrier is electrically energized, it is possible to suppress an electric current from flowing into the case. Incidentally, immediately after starting of an internal combustion engine, etc., a lot of particulate matter (hereinafter referred to as PM) is discharged from combustion chambers. Such PM conducts electricity, so if a lot of PM adheres to the mat, there will be a fear that electricity may flow from the catalyst carrier into the case through the PM.

PRIOR ART REFERENCES

Patent Documents

First Patent Document: Japanese patent application laid-open No. H05-269387

SUMMARY OF THE INVENTION

Problems to be Solved by the Invention

The present invention is made in view of the problems as mentioned above, and has for its object to provide a technique of suppressing electricity from flowing to a case of an electric heating type catalyst.

Means for Solving the Problems

In order to achieve the above-mentioned object, an electric heating type catalyst according to the present invention resides in an electric heating type catalyst which is provided with a heat generation element that is electrically energized to generate heat, a case that receives said heat generation element therein, and a mat that is inserted between said heat generation element and said case for insulating electricity, wherein said case is formed into double pipes at an upstream side and at a downstream side of said heat generation element, respectively;

an inner pipe of each of said double pipes is formed such that it is in contact at an upstream side or downstream side one end thereof with an outer pipe of said each double pipe, with a gap being formed between the inner pipe and the outer pipe of said each double pipe at an upstream side or downstream side other end of the inner pipe; and an insulating layer for insulating electricity is provided on a surface of said case which extends from said mat to the other end of said inner pipe including a range surrounded by the outer pipe and the inner pipe of said each double pipe.

The heat generation element may also be a carrier for a catalyst, and may be formed at an upstream side of the catalyst. The mat is in contact with the heat generation element and the case, respectively. The mat is also used so as to fix the heat generation element inside the case. One end of each double pipe is closed by the contact of the inner pipe of the double pipe with the outer pipe of the double pipe at the upstream side or downstream side one end thereof. Also, the other end of each double pipe is opened due to the gap formed between the inner pipe of the double pipe and the outer pipe of the double pipe at the upstream side or downstream side other end thereof.

The insulating layer is formed in the range surrounded by the outer pipe and the inner pipe of each double pipe. This insulating layer is formed on an inner peripheral surface of the outer pipe of each double pipe, and on an outer peripheral surface of the inner pipe of the double pipe. Because the outer pipe and the inner pipe of each double pipe are connected with each other through said one end, there is no interruption or gap between the insulating layer formed on the outer pipe of the double pipe and the insulating layer formed on the inner pipe thereof. In addition, the insulating layer is also formed from the mat to said other end. That is, the insulating layer continues without interruption from the mat to the range surrounded by the outer pipe and the inner pipe of each double pipe through said other end.

In cases where PM has not adhered to the inside of the case, it is possible to suppress electricity from flowing from the heat generation element to the mat, due to the existence of the mat. On the other hand, if PM adheres to the inside of the case, electricity will flow to the case side through this PM. However, the insulating layer is formed on the case, so electricity is interrupted or blocked by the insulating layer.

Here, the inner pipe of each double pipe becomes higher in temperature than the outer pipe thereof. For this reason, a thermal phoresis effect can be obtained. Due to this thermal phoresis effect, PM moves from the inner pipe of the double pipe toward the outer pipe thereof, so the adhesion of PM is suppressed on the outer peripheral surface of the inner pipe. In addition, because the insulating layer is formed on the outer peripheral surface of the inner pipe, electricity does not flow thereto. That is, even if electricity flows to the PM adhered to the inside of the case at the time when the heat generation element is electrically energized, the electricity is interrupted on the outer peripheral surface of the inner pipe of each double pipe. As a result, electricity is suppressed from flowing to the case.

Note that in the present invention, each of said double pipes may be arranged in a tapered portion which has a passage cross sectional area for exhaust gas decreasing in accordance with an increasing distance from said heat generation element.

Here, in order to make the resistance smaller at the time when the exhaust gas passes through the heat generation element, the passage area of the heat generation element is made larger than the passage areas of portions of the exhaust passage at the upstream side and at the downstream side thereof. For this purpose, the tapered portion is formed in a connection portion between the exhaust passage and the case, so that the passage area of the exhaust passage is expanded or reduced. By arranging a double pipe in this tapered portion, it is possible to attain the reduction in size of the case.

In addition, in the present invention, a plate may be provided which protrudes from a surface of the inner pipe of each of said double pipes directed to a central side of the exhaust passage.

By means of this plate, the area to receive the heat of the exhaust gas can be enlarged, so the temperature of the inner pipe of each double pipe can be made higher. As a result of this, the difference in temperature between the inner pipe and the outer pipe of the double pipe becomes larger, so the thermal phoresis effect also becomes large. In addition, because the temperature of the inner pipe of each double pipe becomes high, even if PM adheres to the inner pipe, this PM can be oxidized and thereby removed.

Moreover, in the present invention, a catalyst with an oxidation function may be provided on a surface of the inner pipe of each of said double pipes which is directed to the central side of the exhaust passage.

By this catalyst, unburnt fuel in the exhaust gas is oxidized, so that heat is thereby generated, thus making the temperature of the inner pipe of the double pipe high. As a result of this, the thermal phoresis effect becomes large. In addition, even if PM adheres to the inner pipe of the double pipe, this PM can be oxidized and thereby removed.

Further, in the present invention, a cooling device may be provided which serves to cool the outer pipe of each of said double pipes.

The cooling device need only be one which takes heat from the outer pipe of the double pipe. By cooling the outer pipe of the double pipe, the temperature of the outer pipe of the double pipe falls, so the thermal phoresis effect becomes large.

Furthermore, in the present invention, said case may be formed by joining an upstream side portion and a downstream side portion to each other after the upstream side portion and the downstream side portion are formed separately from each other, and a joined portion at which the upstream side portion and the downstream side portion are joined to each other may be provided within a range of said case in which said case is in contact with said mat.

Here, because the exhaust gas does not flow into the mat, if a portion of the case lies within the range in which the mat and the case are in contact with each other, PM will not adhere to that portion of the case. That is, if the portion of the case lies within the range in which the case is in contact with the mat, electricity will be suppressed from flowing from the heat generation element to the case, even if an insulating layer is not formed on the case. With the provision of the joined portion in this range, it becomes unnecessary to form an insulating layer in the joined portion. For example, when welding is carried out in a portion of the case outside of the range in which the case is in contact with the mat, there exists no insulating layer on the welded portion, and hence an insulating layer has to be again formed, but if welding is carried out within the range in which the case is in contact with the mat, it is not necessary to form an insulating layer again.

In addition, in the present invention, said case may be formed by joining an upstream side portion and a downstream side portion to each other after the upstream side portion and the downstream side portion are formed separately from each other, and a joined portion at which the upstream side portion and the downstream side portion are joined to each other may be provided in a place where a passage cross sectional area of a tapered portion, of which the passage cross sectional area for exhaust gas decreases in accordance with an increasing distance from said heat generation element, is the largest.

That is, if the joined portion is arranged at a location away from the double pipe, it is possible to form the insulating layer in an easy manner even after the joining has been carried out.

In order to achieve the above-mentioned object, a manufacturing method of an electric heating type catalyst according to the present invention resides in a method for manufacturing an electric heating type catalyst which is provided with a heat generation element that is electrically energized to generate heat, a case that receives said heat generation element therein, and a mat that is inserted between said heat generation element and said case for insulating electricity, wherein said case is formed into double pipes at an upstream side and at a downstream side of said heat generation element, respectively;

an inner pipe of each of said double pipes is formed such that it is in contact at an upstream side or downstream side one end thereof with an outer pipe of said each double pipe, with a gap being formed between the inner pipe and the outer pipe of said each double pipe at an upstream side or downstream side other end of the inner pipe; and an insulating layer for insulating electricity is provided on a surface of said case which extends from said mat to the other end of said inner pipe including a range surrounded by the outer pipe and the inner pipe of said each double pipe;

said method comprising:

a step to form an upstream side portion and a downstream side portion respectively from a joined portion joining the upstream side and the downstream side, the joined portion is located in a range of said case which is contact with said mat;

a step to form said insulating layer in each of said upstream side portion and said downstream side portion;

a step to place said heat generation element and said mat at an inner side of said upstream side portion and said downstream side portion of said case; and a step to join said upstream side portion and said downstream side portion of said case to each other at said joined portion.

In addition, in order to achieve the above-mentioned object, a manufacturing method of an electric heating type catalyst according to the present invention resides in a method for manufacturing an electric heating type catalyst which is provided with a heat generation element that is electrically energized to generate heat, a case that receives said heat generation element therein, and a mat that is inserted between said heat generation element and said case for insulating electricity, wherein said case is formed into double pipes at an upstream side and at a downstream side of said heat generation element, respectively;

an inner pipe of each of said double pipes is formed such that it is in contact at an upstream side or downstream side one end thereof with an outer pipe of said each double pipe, with a gap being formed between the inner pipe and the outer pipe of said each double pipe at an upstream side or downstream side other end of the inner pipe; and an insulating layer for insulating electricity is provided on a surface of said case which extends from said mat to the other end of said inner pipe including a range surrounded by the outer pipe and the inner pipe of said each double pipe;

said method comprising:

a step to form an upstream side portion and a downstream side portion respectively form a joined portion joining the upstream side and the downstream side, the joined portion is located in a portion of said case from said mat to said double pipe;

a step to form said insulating layer in each of said upstream side portion and said downstream side portion;

a step to place said heat generation element and said mat at an inner side of said upstream side portion and said downstream side portion of said case;

a step to join said upstream side portion and said downstream side portion of said case to each other at said joined portion; and a step to form said insulating layer in said joined portion from an inner side of said case.

Effect of the Invention

According to the present invention, it is possible to suppress electricity from flowing to the case of the electric heating type catalyst.

BEST MODES FOR CARRYING OUT THE INVENTION

Hereinafter, reference will be made to a specific embodiment of an electric heating type catalyst and a manufacturing method thereof according to the present invention based on the attached drawings. Here, note that the following embodiments can be combined as appropriate.

First Embodiment

Figure 1:
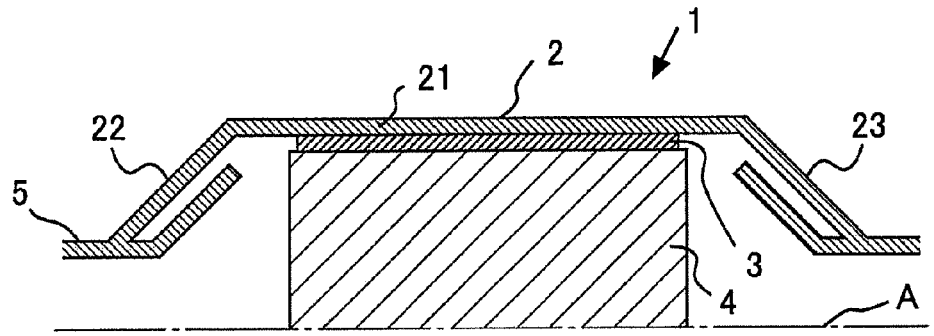
FIG. 1 is a view showing the schematic construction of an electric heating type catalyst according to a first embodiment of the present invention.

FIG. 1 is a view showing the schematic construction of an electric heating type catalyst 1 according to this first embodiment of the present invention. Here, note that the electric heating type catalyst 1 according to this embodiment is arranged in an exhaust pipe 5 of an internal combustion engine mounted on a vehicle. The internal combustion engine may be a diesel engine, or may be a gasoline engine. In addition, it can also be used in a vehicle which adopts a hybrid system with an electric motor.

The electric heating type catalyst 1 shown in FIG. 1 is a cross sectional view cutting the electric heating type catalyst 1 along a central axis A of the exhaust pipe 5 in a longitudinal direction thereof. Here, note that the electric heating type catalyst 1 has a shape with line symmetry with respect to the central axis A, and hence in FIG. 1, only an upper part thereof is shown.

The electric heating type catalyst 1 according to this embodiment is constructed to be provided with a catalyst carrier 4 of a cylindrical shape, a mat 3 which covers an outer periphery of the catalyst carrier 4, and a case 2 which receives therein the catalyst carrier 4 and the mat 3.

A material, which has electric resistance and is electrically energized to generate heat, is used for the catalyst carrier 4. SiC is used for the material of the catalyst carrier 4, for example. The catalyst carrier 4 has a plurality of passages which extend in the direction in which the exhaust gas flows (i.e., the direction of the central axis A), and which have a cross section of honeycomb shape vertical to the direction in which the exhaust gas flows. The exhaust gas flows through these passages. The catalyst carrier 4 has an outer shape which is a cylindrical shape centering on the central axis A of the exhaust pipe 5, for example. Here, note that the sectional shape of the catalyst carrier 4 formed by the cross section which is orthogonal to the central axis A may be an elliptical shape, for example. The central axis A is a central axis common to the exhaust pipe 5, the case 2, and the catalyst carrier 4. Here, note that in this embodiment, the catalyst carrier 4 corresponds to a heat generation element in the present invention. In addition, this embodiment can be applied similarly even in cases where the heat generation element is provided at the upstream side of a catalyst.

The catalyst is carried or supported by this catalyst carrier 4. As the catalyst, there can be mentioned an oxidation catalyst, a three-way catalyst, an occlusion reduction type NOx catalyst, a selective reduction type NOx catalyst, etc., for example. Two pieces of electrodes are connected to the catalyst carrier 4, so that the catalyst carrier 4 is energized by applying a voltage between these electrodes. The catalyst layer 4 generates heat due to the electric resistance thereof. As the material of the mat 3, there is used an insulating material with a small electrical conductivity such as a ceramic fiber. The mat 3 covers the outer periphery (the surface parallel to the central axis A) of the catalyst carrier 4, so when the catalyst carrier 4 is electrically energized, the mat 3 serves to suppress electricity from flowing to the case 2.

The case 2 is constructed to be provided with a reception portion 21 that is composed of a surface parallel to the central axis A so as to receive the mat 3 and the catalyst carrier 4 inside thereof, and tapered portions 22, 23 that connect the reception portion 21 and the exhaust pipe 5 with each other at the upstream and downstream sides of the reception portion 21, respectively. The tapered portions 22, 23 each take a tapered shape of which the passage cross sectional area decreases in accordance with the increasing distance thereof from the reception portion 21. That is, in the tapered portion 22 at the upstream side of the catalyst carrier 4, the more upstream it is, the smaller the cross sectional area thereof becomes, and in the tapered portion 23 at the downstream side of the catalyst carrier 4, the more downstream it is, the smaller the cross sectional area thereof becomes. The inside diameter of the reception portion 21 is substantially the same as the outside diameter of the mat 3 at the time when the catalyst carrier 4 is covered with the mat 3, and when the mat 3 and the catalyst carrier 4 are received into the reception portion 21, the mat 3 is compressed, so the catalyst carrier 4 is fixed into the reception portion 21 due to the repulsive force or resilience of the mat 3.

Metal is used for the material of the case 2, and for example, a stainless steel material can be used. Here, note that the upstream side tapered portion 22 and the downstream side tapered portion 23 are arranged in the opposite directions with respect to each other but are of the same shape. For this reason, in the following, an explanation will be given only to the shape of the upstream side tapered portion 22.

Figure 2:
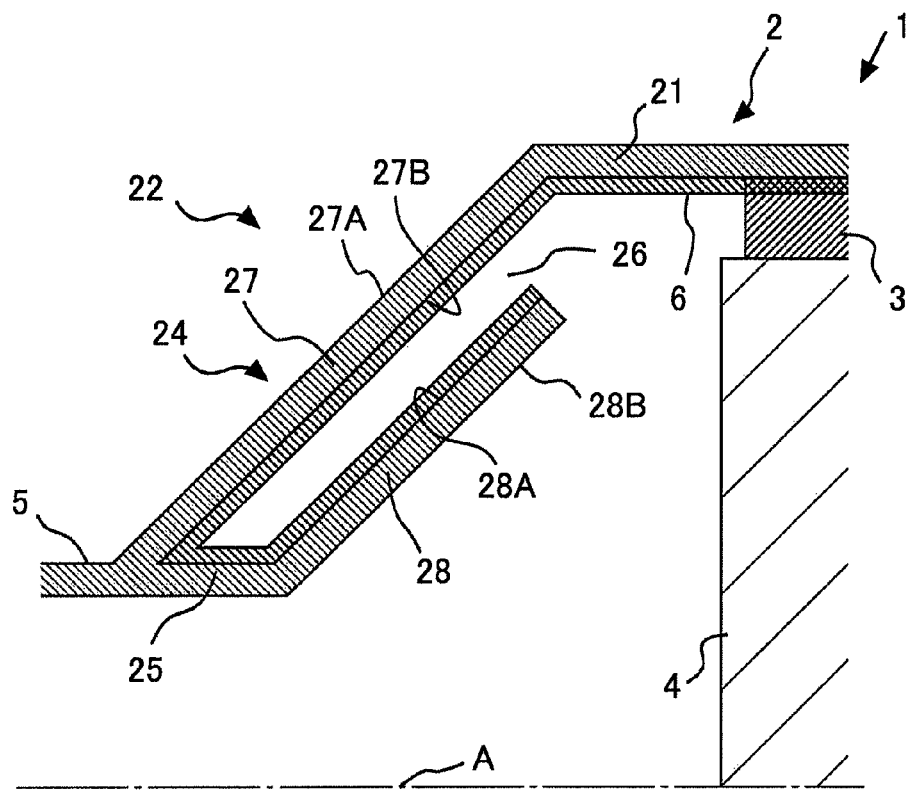
FIG. 2 is an enlarged view of a tapered portion according to the first embodiment.

Here, FIG. 2 is an enlarged view of the tapered portion 22 according to this embodiment. At least a part of the tapered portion 22 is constituted by a double pipe 24. The double pipe 24 is provided with a closure portion 25 that is closed at an upstream side end thereof, and an open portion 26 that is opened at a downstream side end thereof. An outer side pipe (hereinafter referred to as an outer pipe 27) of this double pipe 24 is connected with the reception portion 21. That is, the outer pipe 27 of the double pipe 24 becomes a part of an outer wall of the case 2. In addition, an inner side pipe (hereinafter referred to as an inner pipe 28) of the double pipe 24 bends to the side of the outer pipe 27 in an upstream end of the tapered portion 22, so that it is connected with the outer pipe 27. The outer pipe 27 and the inner pipe 28 are arranged in parallel to each other except for a portion in which the inner pipe 28 is connected with the outer pipe 27. In a portion where the inner pipe 28 and the outer pipe 27 are arranged in parallel to each other, the inner pipe 28 and the outer pipe 27 are arranged apart from each other, by a distance of 13 mm, for example, so that electric discharge may not occur even in cases where a high voltage is applied across the electrodes of the catalyst carrier 4. Here, note that the entire tapered portion 22 need not be constituted by the double pipe 24.

In this manner, the double pipe 24 is formed so as to open toward the side of the catalyst carrier 4. That is, the inner pipe 28 of the double pipe 24 is formed in such a manner that it is in contact, at one upstream side end thereof, with the outer pipe 27 of the double pipe 24, with a gap provided between the inner pipe 28 and the outer pipe 27 of the double pipe 24 at the other downstream side end thereof. For this reason, an outer peripheral surface 28A and an inner peripheral surface 28B of the inner pipe 28 of the double pipe 24, and in addition an inner peripheral surface 27B of the outer pipe 27 of the double pipe 24 are in contact with the exhaust gas. Also, an outer peripheral surface 27A of the outer pipe 27 of the double pipe 24 is in contact with atmospheric air.

Then, parts of the surfaces of the tapered portion 22 and the reception portion 21 being in contact with the exhaust gas are covered with an insulating layer 6. The insulating layer 6 is formed by coating an insulating material such as ceramic, for example. The insulating layer 6 is formed on the inner peripheral surface 27B of the outer pipe 27 and on the outer peripheral surface 28A of the inner pipe 28. Here, note that the closure portion 25 is a part of the inner pipe 28. That is, the insulating layer 6 is formed in a range which is at an inner side of the outer pipe 27 and at an outer side of the inner pipe 28, and which is surrounded by the outer pipe 27 and the inner pipe 28. In addition, the insulating layer 6 is also formed to extend from the mat 3 to the open portion 26. That is, the insulating layer 6 is formed continuously from the mat 3 to an end of the outer peripheral surface 28A of the inner pipe 28 at the side of the open portion 26 on the surface thereof. Here, note that it is not necessary to form the insulating layer 6 on the inner peripheral surface 28B of the inner pipe 28. In addition, the exhaust gas hardly flows to a portion of the reception portion 21 which is in contact with the mat 3, so there is also no fear that PM may adhere to that portion of the reception portion 21, and hence it is not necessary to form the insulating layer 6 thereon. However, in order to prevent a short circuit in a more reliable manner, the insulating layer 6 may also be formed on the surface of the case 2 in a portion thereof in which the mat 3 is arranged. Moreover, the insulating layer 6 may be formed so as to slightly come into a range in which the mat 3 is arranged.

In the electric heating type catalyst 1 constructed in this manner, the outer peripheral surface 27A of the outer pipe 27 is in contact with atmospheric air, and the inner peripheral surface 27B of the outer pipe 27 is in contact with the exhaust gas. Accordingly, even if the outer pipe 27 receives heat from the exhaust gas, this heat will be taken by atmospheric air. That is, the outer pipe 27 is cooled by atmospheric air. On the other hand, both the outer peripheral surface 28A and the inner peripheral surface 28B of the inner pipe 28 is in contact with the exhaust gas. As a result of this, the temperature of the inner pipe 28 becomes higher as compared with the temperature of the outer pipe 27. Here, at the cold time of the internal combustion engine or the like, PM is contained in the exhaust gas from the internal combustion engine. This PM adheres to those parts inside the case 2 which are in contact with the exhaust gas. Then, the PM in the exhaust gas also adheres to the upstream end and the downstream end of the mat 3, and further to the interior of the case 2. Because this PM conducts electricity, electricity flowing to the catalyst carrier 4 may also flow to the PM adhered to the mat 3 and the case 2. That is, there is a possibility that a short circuit may occur due to the accumulation of PM.

Here, if the insulating layer 6 should not be provided, when an electric current is supplied to the catalyst carrier 4, the electric current will also flow into the case 2 through the PM. That is, there will be a possibility of a short circuit. On the other hand, if only the insulating layer 6 is provided without the provision of the double pipe 24, PM will adhere to the surface of the insulating layer 6. Accordingly, when an electric current is supplied to the catalyst carrier 4, the electric current also flows into the PM adhered to the surface of the insulating layer 6, so the electric current will flow into the case 2 or the exhaust pipe 5 from those places on which the insulating layer 6 is not formed.

In contrast to this, the adhesion of PM can be suppressed due to the provision of the above-mentioned double pipe 24. Here, the temperature of the inner pipe 28 becomes higher than the temperature of the outer pipe 27, so a thermal phoresis effect can be obtained. Due to this thermal phoresis effect, PM is caused to move from the side of the inner pipe 28 of high temperature to the side of the outer pipe 27 of low temperature, so the PM does not accumulate on the outer peripheral surface 28A of the inner pipe 28. Then, because the insulating layer 6 is formed on the outer peripheral surface 28A of the inner pipe 28, electricity does not flow to the outer peripheral surface 28A of the inner pipe 28. That is, an electric current is interrupted or blocked on the outer peripheral surface 28A of the inner pipe 28, thus making it possible to suppress electricity from flowing from the catalyst carrier 4 to the case 2.

Second Embodiment

Figure 3:
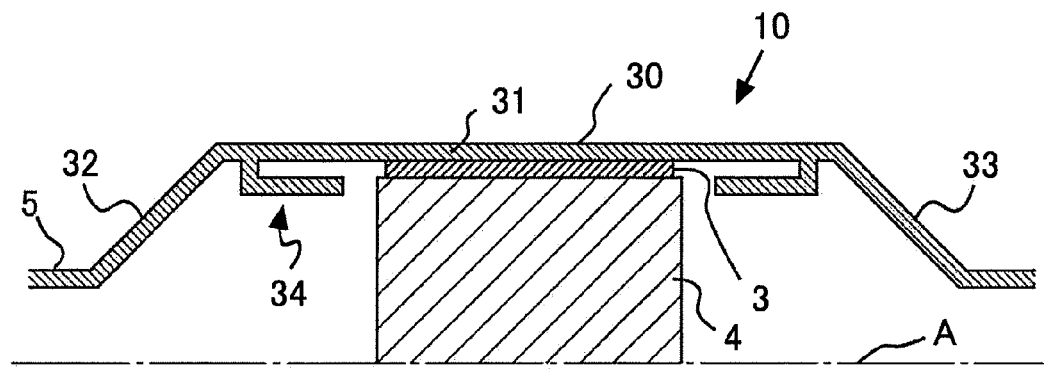
FIG. 3 is a view showing the schematic construction of an electric heating type catalyst according to a second embodiment of the present invention.
Figure 4:
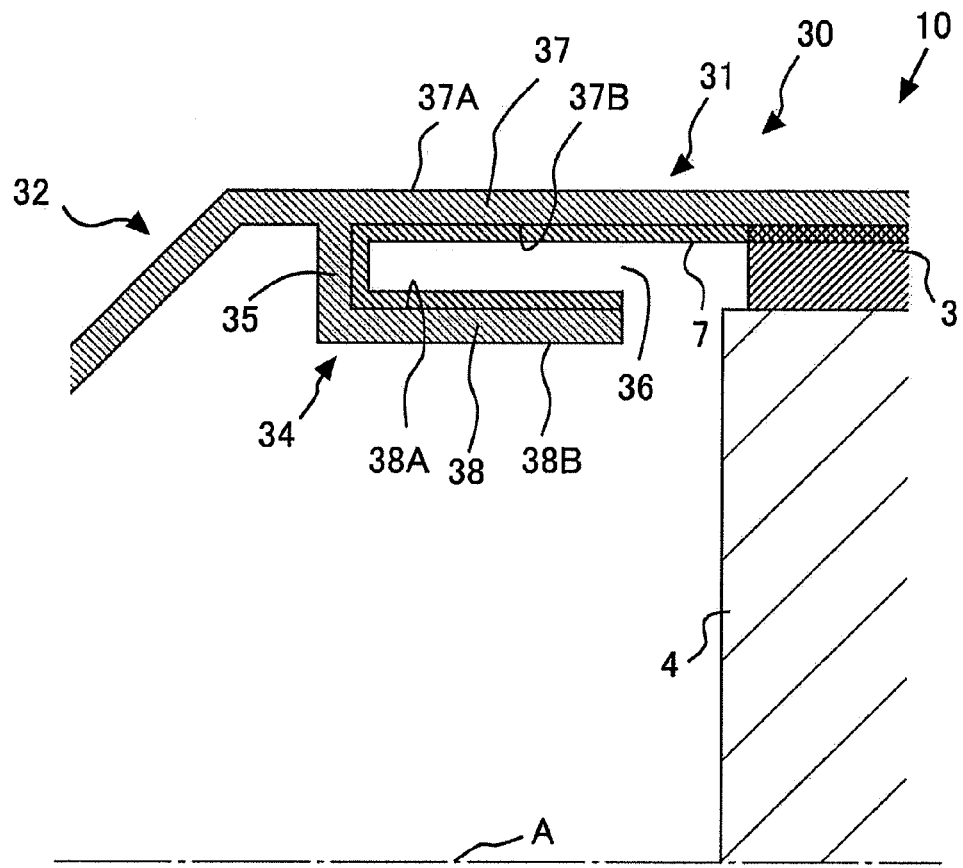
FIG. 4 is an enlarged view of a part in which a double pipe shown in FIG. 3 is provided.

FIG. 3 is a view showing the schematic construction of an electric heating type catalyst 10 according to this second embodiment of the present invention. In addition, FIG. 4 is an enlarged view of a part in which a double pipe 34 shown in FIG. 3 is provided. What is different from the electric heating type catalyst 1 shown in the first embodiment will be explained. The electric heating type catalyst 10 shown in FIG. 3 is different in the shape of a case 30 from that of the first embodiment. That is, the double pipe 34 is arranged not in tapered portions 32, 33, but in a reception portion 31 at the upstream side and a reception portion 31 at the downstream side of a mat 3, respectively. For a catalyst carrier 4 and the mat 3, there are used the same ones as those in the first embodiment. Here, note that the reception portion 31 at the upstream side of the mat 3 and the reception portion 31 at the downstream side of the mat 3 are arranged in the opposite directions with respect to each other but are of the same shape. For this reason, in the following, an explanation will be given only to the shape of the upstream side reception portion 31.

The double pipe 34 is provided with a closure portion 35 that is closed at an upstream side end thereof, and an open portion 36 that is opened at a downstream side end thereof. An outer pipe 37 of the double pipe 34 becomes a part of an outer wall of the reception portion 31. In addition, an inner pipe 38 of the double pipe 34 bends at its upstream end to the side of the outer pipe 37, so that it is connected with the outer pipe 37. The outer pipe 37 and the inner pipe 38 are arranged in parallel to each other except for a portion in which the inner pipe 38 is connected with the outer pipe 37. In a portion where the inner pipe 38 and the outer pipe 37 are arranged in parallel to each other, the inner pipe 38 and the outer pipe 37 are arranged apart from each other, by a distance of 13 mm, for example, so that electric discharge may not occur even in cases where a high voltage is applied across the electrodes of the catalyst carrier 4. In this manner, the double pipe 34 is formed so as to open toward the side of the catalyst carrier 4. That is, the inner pipe 38 of the double pipe 34 is formed in such a manner that it is in contact, at one upstream side end thereof, with the outer pipe 37 of the double pipe 34, with a gap provided between the inner pipe 38 and the outer pipe 37 of the double pipe 34 at the other downstream side end thereof. For this reason, an outer peripheral surface 38A and an inner peripheral surface 38B of the inner pipe 38 of the double pipe 34, and in addition an inner peripheral surface 37B of the outer pipe 37 of the double pipe 34 are in contact with the exhaust gas. Also, an outer peripheral surface 37A of the outer pipe 37 of the double pipe 34 is in contact with atmospheric air.

Then, a part of the surface of the reception portion 31 being in contact with the exhaust gas is covered with an insulating layer 7. The insulating layer 7 is formed by coating an insulating material such as ceramic, for example. The insulating layer 7 is formed on the inner peripheral surface 37B of the outer pipe 37 and on the outer peripheral surface 38A of the inner pipe 38. Here, note that the closure portion 35 is a part of the inner pipe 38. That is, the insulating layer 7 is formed in a range which is at an inner side of the outer pipe 37 and at an outer side of the inner pipe 38, and which is surrounded by the outer pipe 37 and the inner pipe 38. In addition, the insulating layer 7 is also formed to extend from the mat 3 to the open portion 36. That is, the insulating layer 7 is formed continuously from the mat 3 to an end of the outer peripheral surface 38A of the inner pipe 38 at the side of the open portion 36 on the surface thereof. Here, note that it is not necessary to form the insulating layer 7 on the inner peripheral surface 38B of the inner pipe 38. Also, it is not necessary to form the insulating layer 7 on the tapered portions 32, 33.

In the electric heating type catalyst 10 constructed in this manner, the outer peripheral surface 37A of the outer pipe 37 is in contact with atmospheric air, and the inner peripheral surface 37B of the outer pipe 37 is in contact with the exhaust gas. Accordingly, even if the outer pipe 37 receives heat from the exhaust gas, this heat will be taken by atmospheric air. That is, the outer pipe 37 is cooled by atmospheric air. On the other hand, both the outer peripheral surface 38A and the inner peripheral surface 38B of the inner pipe 38 is in contact with the exhaust gas. As a result of this, the temperature of the inner pipe 38 becomes higher as compared with the temperature of the outer pipe 37, so a thermal phoresis effect can be obtained. Due to this thermal phoresis effect, PM is caused to move from the side of the inner pipe 38 of high temperature to the side of the outer pipe 37 of low temperature, so the PM does not accumulate on the outer peripheral surface 38A of the inner pipe 38. Then, because the insulating layer 7 is formed on the outer peripheral surface 38A of the inner pipe 38, electricity does not flow to the outer peripheral surface 38A of the inner pipe 38. That is, an electric current is interrupted or blocked on the outer peripheral surface 38A of the inner pipe 38, thus making it possible to suppress electricity from flowing from the catalyst carrier 4 to the case 30.

Third Embodiment

Figure 5:
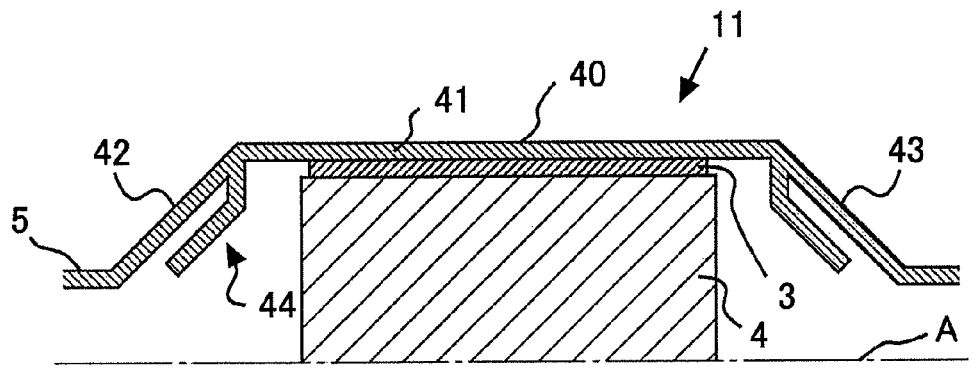
FIG. 5 is a view showing the schematic construction of an electric heating type catalyst according to a third embodiment of the present invention.
Figure 6:
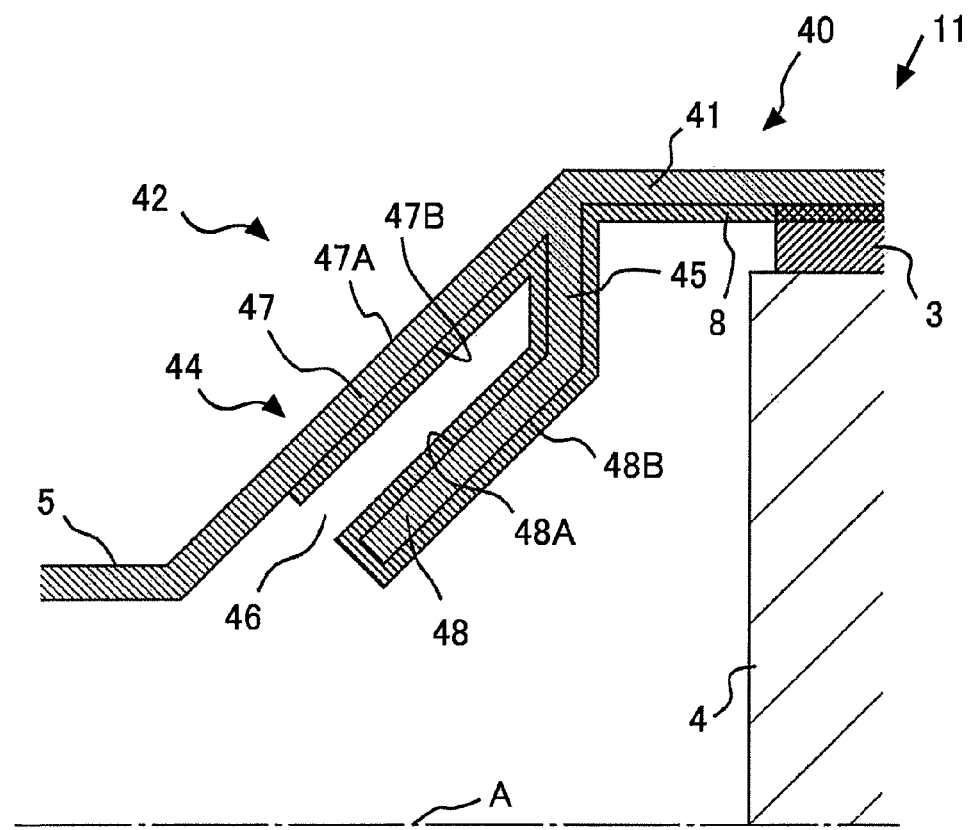
FIG. 6 is an enlarged view of a part in which a double pipe shown in FIG. 5 is provided.

FIG. 5 is a view showing the schematic construction of an electric heating type catalyst 11 according to this third embodiment of the present invention. In addition, FIG. 6 is an enlarged view of a part in which a double pipe 44 shown in FIG. 5 is provided. What is different from the electric heating type catalyst 1 shown in the first embodiment will be explained. The electric heating type catalyst 11 shown in FIG. 5 is different in the shape of a case 40 from that of the first embodiment. That is, the position of a closure portion 45 and the position of an open portion 46 of the double pipe 44 are arranged in a reverse relation with respect to those of the electric heating type catalyst 1 shown in FIG. 1. Here, note that an upstream side tapered portion 42 and a downstream side tapered portion 43 are arranged in the opposite directions with respect to each other but are of the same shape. For this reason, in the following, an explanation will be given only to the shape of the upstream side tapered portion 42.

The double pipe 44 is provided with the closure portion 45 that is closed at a downstream side end thereof, and the open portion 46 that is opened at an upstream side end thereof. An outer pipe 47 of the double pipe 44 becomes a part of an outer wall of a reception portion 41. That is, the outer pipe 47 of the double pipe 44 becomes a part of an outer wall of the case 40. In addition, an inner pipe 48 of the double pipe 44 bends at an downstream end of the tapered portion 42 to the side of the outer pipe 47, so that it is connected with the outer pipe 47. The outer pipe 47 and the inner pipe 48 are arranged in parallel to each other except for a portion in which the inner pipe 48 is connected with the outer pipe 47. In this manner, the double pipe 44 is formed so as to close toward the side of a catalyst carrier 4. That is, the inner pipe 48 of the double pipe 44 is formed in such a manner that it is in contact, at one downstream side end thereof, with the outer pipe 47 of the double pipe 44, with a gap provided between the inner pipe 48 and the outer pipe 47 of the double pipe 44 at the other upstream side end thereof. For this reason, an outer peripheral surface 48A and an inner peripheral surface 48B of the inner pipe 48 of the double pipe 44, and in addition an inner peripheral surface 47B of the outer pipe 47 of the double pipe 44 are in contact with the exhaust gas. Also, an outer peripheral surface 47A of the outer pipe 47 of the double pipe 44 is in contact with atmospheric air. Here, note that the entire tapered portion 42 need not be constituted by the double pipe 44.

Then, parts of the surfaces of the tapered portion 42 and the reception portion 41 being in contact with the exhaust gas are covered with an insulating layer 8. The insulating layer 8 is formed by coating an insulating material such as ceramic, for example. The insulating layer 8 is formed on the inner peripheral surface 47B of the outer pipe 47 and on the outer peripheral surface 48A of the inner pipe 48. Here, note that the closure portion 45 is a part of the inner pipe 48. That is, the insulating layer 8 is formed in a range which is at an inner side of the outer pipe 47 and at an outer side of the inner pipe 48, and which is surrounded by the outer pipe 47 and the inner pipe 48. In addition, the insulating layer 8 is also formed to extend from a mat 3 to the open portion 46. That is, the insulating layer 8 is also formed on the inner peripheral surface 48B of the inner pipe 48. As a result of this, the insulating layer 8 is formed continuously from the mat 3 to an end of the inner peripheral surface 47B of the outer pipe 47 at the side of the open portion 46 on the surface thereof.

In the electric heating type catalyst 11 constructed in this manner, too, the temperature of the inner pipe 48 becomes higher as compared with the temperature of the outer pipe 47, so a thermal phoresis effect can be obtained. Due to this thermal phoresis effect, PM is caused to move from the side of the inner pipe 48 of high temperature to the side of the outer pipe 47 of low temperature, so the PM does not accumulate on the outer peripheral surface 48A of the inner pipe 48. Then, because the insulating layer 8 is formed on the outer peripheral surface 48A of the inner pipe 48, electricity does not flow to the outer peripheral surface 48A of the inner pipe 48. That is, an electric current is interrupted or blocked on the outer peripheral surface 48A of the inner pipe 48, thus making it possible to suppress electricity from flowing from the catalyst carrier 4 to the case 40.

Fourth Embodiment

Figure 7:
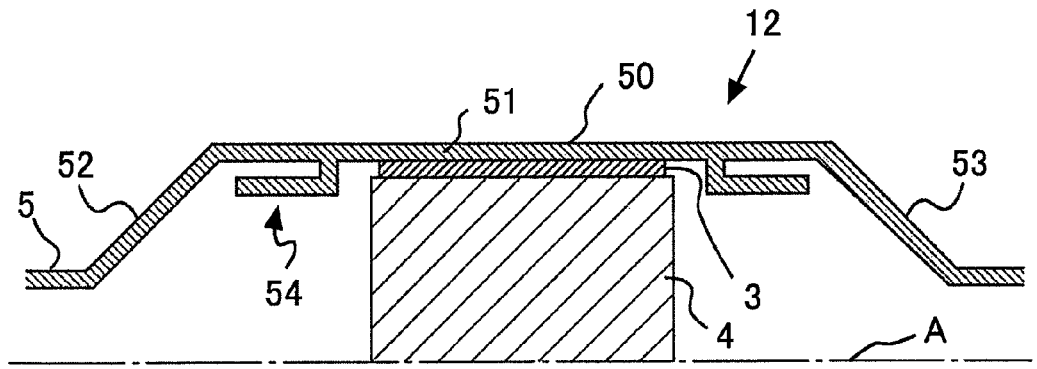
FIG. 7 is a view showing the schematic construction of an electric heating type catalyst according to a fourth embodiment of the present invention.
Figure 8:
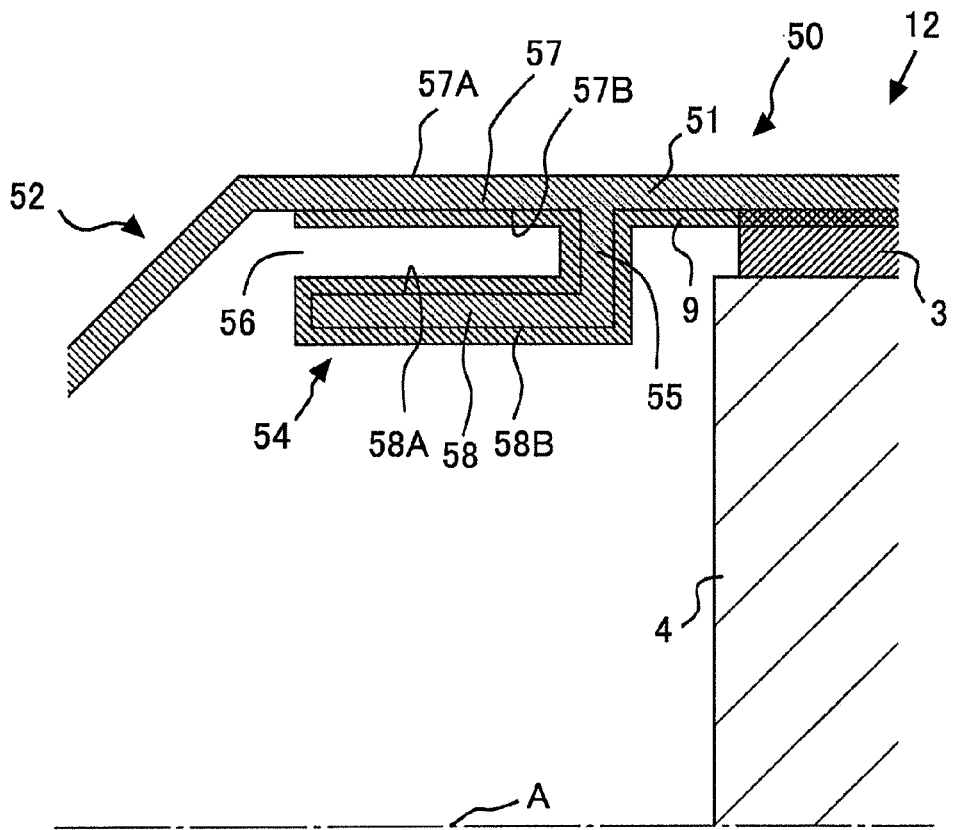
FIG. 8 is an enlarged view of a part in which a double pipe shown in FIG. 7 is provided.

FIG. 7 is a view showing the schematic construction of an electric heating type catalyst 12 according to this fourth embodiment of the present invention. In addition, FIG. 8 is an enlarged view of a part in which a double pipe 54 shown in FIG. 7 is provided. What is different from the electric heating type catalyst 10 shown in the second embodiment will be explained. In the electric heating type catalyst 12 shown in FIG. 7, the position of a closure portion 55 and the position of an open portion 56 of the double pipe 54 are arranged in a reverse relation with respect to those of the electric heating type catalyst 11 shown in FIG. 3. Here, note that a reception portion 51 at the upstream side of a mat 3 and a reception portion 51 at the downstream side of the mat 3 are arranged in the opposite directions with respect to each other but are of the same shape. For this reason, in the following, an explanation will be given only to the shape of the upstream side reception portion 51.

The double pipe 54 is provided with the closure portion 55 that is closed at a downstream side end thereof, and the open portion 56 that is opened at an upstream side end thereof. An outer pipe 57 of the double pipe 54 becomes a part of an outer wall of the reception portion 51. In addition, an inner pipe 58 of the double pipe 54 bends at its downstream end to the side of the outer pipe 57, so that it is connected with the outer pipe 57. The outer pipe 57 and the inner pipe 58 are arranged in parallel to each other except for a portion in which the inner pipe 58 is connected with the outer pipe 57. In this manner, the double pipe 54 is formed so as to close toward the side of a catalyst carrier 4. That is, the inner pipe 58 of the double pipe 54 is formed in such a manner that it is in contact, at one downstream side end thereof, with the outer pipe 57 of the double pipe 54, with a gap provided between the inner pipe 58 and the outer pipe 57 of the double pipe 54 at the other upstream side end thereof. For this reason, an outer peripheral surface 58A and an inner peripheral surface 58B of the inner pipe 58 of the double pipe 54, and in addition an inner peripheral surface 57B of the outer pipe 57 of the double pipe 54 are in contact with the exhaust gas. Also, an outer peripheral surface 57A of the outer pipe 57 of the double pipe 54 is in contact with atmospheric air.

Then, a part of the surface of the reception portion 51 being in contact with the exhaust gas is covered with an insulating layer 9. The insulating layer 9 is formed by coating an insulating material such as ceramic, for example. The insulating layer 9 is formed on the inner peripheral surface 57B of the outer pipe 57 and on the outer peripheral surface 58A of the inner pipe 58. Here, note that the closure portion 55 is a part of the inner pipe 58. That is, the insulating layer 9 is formed in a range which is at an inner side of the outer pipe 57 and at an outer side of the inner pipe 58, and which is surrounded by the outer pipe 57 and the inner pipe 58. In addition, the insulating layer 9 is also formed to extend from the mat 3 to the open portion 56. That is, the insulating layer 9 is formed also in the inner peripheral surface 58B of the inner pipe 58. As a result of this, the insulating layer 9 is formed continuously from the mat 3 to an end of the inner peripheral surface 57B of the outer pipe 57 at the side of the open portion 56 on the surface thereof. Here, note that it is not necessary to form the insulating layer 9 on the tapered portions 52, 53.

In the electric heating type catalyst 12 constructed in this manner, too, the temperature of the inner pipe 58 becomes higher as compared with the temperature of the outer pipe 57, so a thermal phoresis effect can be obtained. Due to this thermal phoresis effect, PM is caused to move from the side of the inner pipe 58 of high temperature to the side of the outer pipe 57 of low temperature, so the PM does not accumulate on the outer peripheral surface 58A of the inner pipe 58. Then, because the insulating layer 9 is formed on the outer peripheral surface 58A of the inner pipe 58, electricity does not flow to the outer peripheral surface 58A of the inner pipe 58. That is, an electric current is interrupted or blocked on the outer peripheral surface 58A of the inner pipe 58, thus making it possible to suppress electricity from flowing from the catalyst carrier 4 to a case 50.

Figure 9:
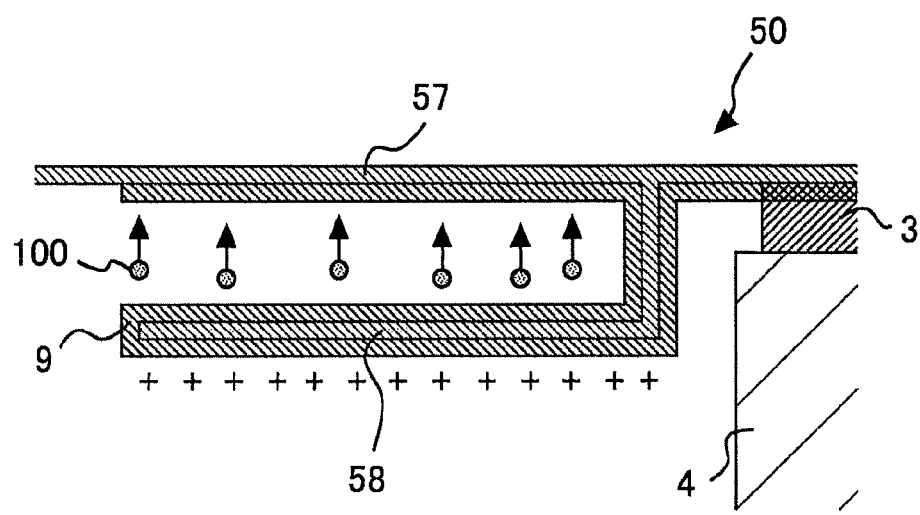
FIG. 9 is an enlarged view of the double pipe.

However, static electricity is generated due to friction at the time when the exhaust gas flows through the inner peripheral surface 58B of the inner pipe 58, so that the inner pipe 58 is thereby charged positively. Here, FIG. 9 is an enlarged view of the double pipe 54. Because PM 100 is positively charged, if the inner pipe 58 is positively charged, a force to separate the PM 100 from the inner pipe 58 will act on the PM 100.

Here, even if the PM 100 adheres to the inner peripheral surface 58B of the inner pipe 58, this PM 100 is insulated by the mat 3 and the insulating layer 9, so the inner pipe 58 is maintained in a state positively charged. For this reason, the PM 100 positively charged can be kept away from the inner pipe 58. In addition, static electricity is generated even if the temperature is low, so it is possible to suppress the PM 100 from adhering to the inner pipe 58 from immediately after starting of the internal combustion engine. This effect of static electricity can be obtained if it is shaped or arranged such that the closure portion 55 is in a position closer to the mat 3 than the open portion 56 is, as a consequence of which the same effect can be obtained even with the shape or arrangement as explained in the above-mentioned third embodiment. In this manner, due to the generation of static electricity, too, it is possible to suppress the PM 100 from adhering to the outer peripheral surface 58A of the inner pipe 58. For this reason, it is possible to suppress electricity from flowing to the case 50.

Fifth Embodiment

Figure 10:
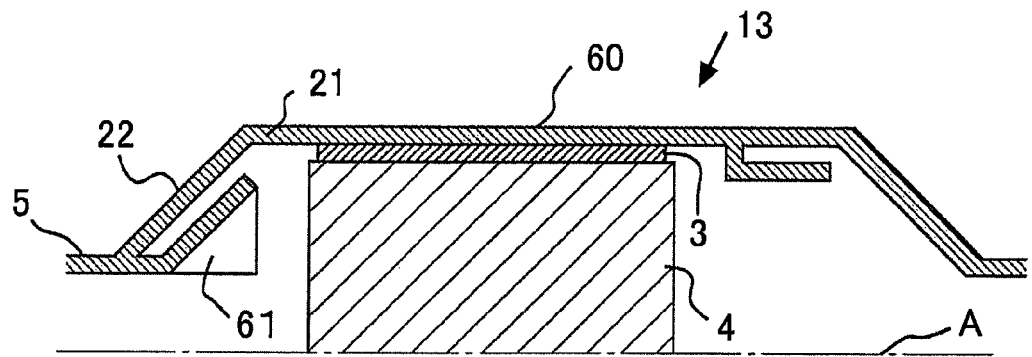
FIG. 10 is a view showing the schematic construction of an electric heating type catalyst according to a fifth embodiment of the present invention.
Figure 11:
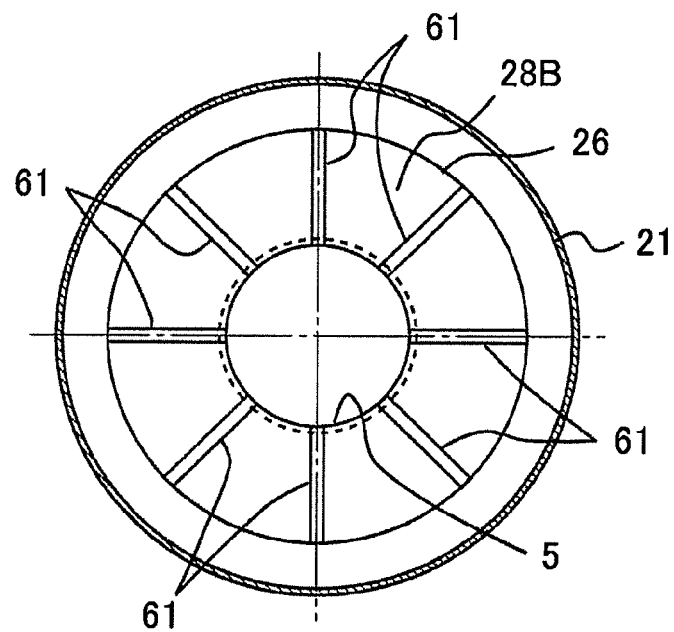
FIG. 11 is a view looking at a tapered portion from the side of a catalyst carrier 4.

FIG. 10 is a view showing the schematic construction of an electric heating type catalyst 13 according to this fifth embodiment of the present invention. In addition, FIG. 11 is a view looking at a tapered portion 22 from the side of a catalyst carrier 4. What is different from the electric heating type catalyst 1 shown in the first embodiment will be explained. Here, note that the shape of a case 60 at the downstream side of the catalyst carrier 4 is the same as the shape thereof explained in the fourth embodiment, and an explanation thereof is omitted. In addition, the shape thereof at the upstream side of the catalyst carrier 4 is the same as the shape explained in the first embodiment except for the provision of plates 61.

In this embodiment, provision is made for the plates 61, each of which protrudes from an inner peripheral surface 28B of an inner pipe 28. The plates 61 are arranged vertically to the inner peripheral surface 28B of the inner pipe 28 and in parallel to the central axis of the case 60. The material of the plates 61 is the same as that of the inner pipe 28, and is a stainless steel material, for example. The plates 61, being eight, are arranged on the upstream side tapered portion 22 in a radial manner around the central axis A of the case 60 as a center. Here, note that the number of plates 61 is not limited to eight but may be other numbers. In addition, although in FIG. 10 and FIG. 11, an end of each plate 61 at the side of the central axis A is arranged on an extension of the exhaust pipe 5, each plate 61 may extend to near the central axis A, or may extend to the central axis A so that it may be integrated with the other plates 61. Also, it is not necessary to form an insulating layer 6 on the plates 61.

In the electric heating type catalyst 13 constructed in this manner, the plates 61 receive the heat of the exhaust gas and transmit it to the inner pipe 28. As a result of this, the temperature of the inner pipe 28 becomes higher, and hence the difference in temperature between the outer pipe 27 and the inner pipe 28 becomes larger. That is, the area receiving heat is increased by means of the plates 61. Accordingly, a thermal phoresis effect becomes more remarkable, so that it is possible to suppress electricity from flowing to the case 60, in a more efficient manner. In addition, because the temperature of the inner pipe 28 becomes higher, the PM adhered to the inner pipe 28 can be oxidized and thereby removed.

As described above, according to this embodiment, the temperature of the inner pipe 28 can be made higher by the provision of the plates 61 on the inner pipe 28. As a result of this, the amount of PM moving from the inner pipe 28 toward the outer pipe 27 can be made more. In addition, the PM adhered to the inner pipe 28 can be made to burn.

Here, note that in this embodiment, the plates 61 are arranged only at the upstream side of the catalyst carrier 4, but such plates may also be similarly arranged on an inner peripheral surface of a downstream side inner pipe. In addition, plates may be arranged only on an inner peripheral surface of an inner pipe at the downstream side of the catalyst carrier 4.

Sixth Embodiment

Figure 12:
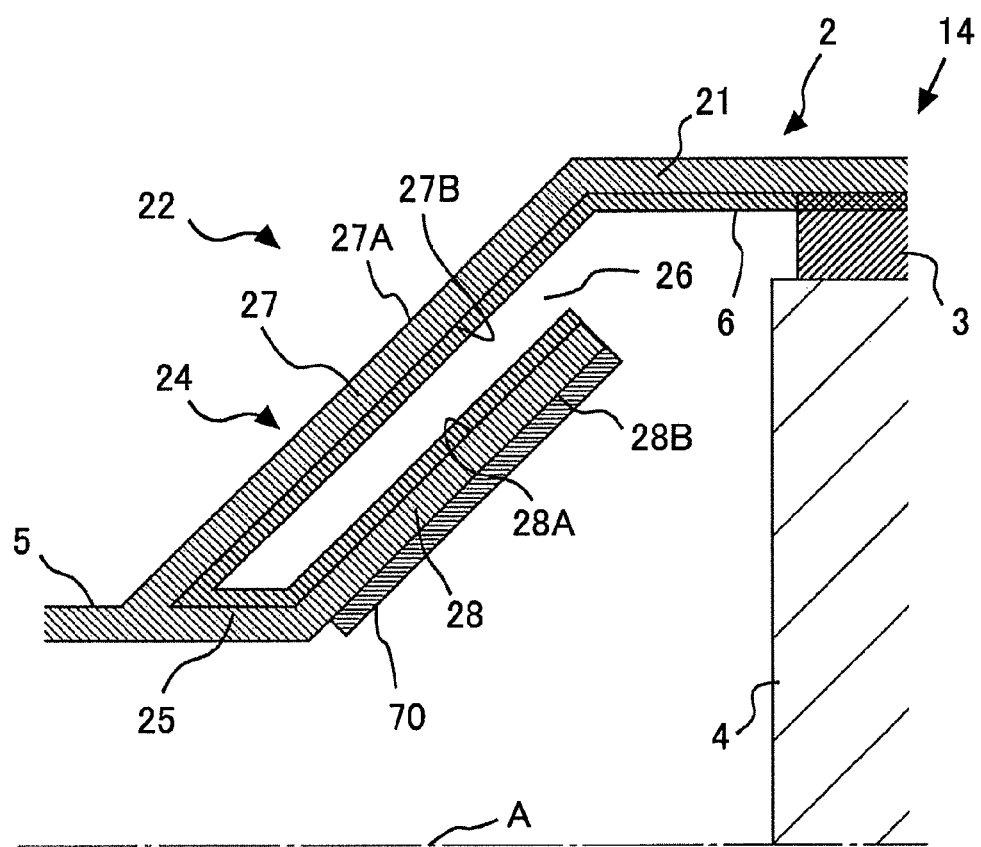
FIG. 12 is a view showing the schematic construction of an electric heating type catalyst according to a sixth embodiment of the present invention.

FIG. 12 is a view showing the schematic construction of an electric heating type catalyst 14 according to this sixth embodiment of the present invention. What is different from the electric heating type catalyst 1 shown in the first embodiment will be explained. In the electric heating type catalyst 14 shown in FIG. 12, a catalyst 70 is coated on an inner peripheral surface 28B of an inner pipe 28. This catalyst 70 is, for example, a catalyst which has an oxidation function, and for which an oxidation catalyst or a three-way catalyst can be exemplarily mentioned. In other respects, this sixth embodiment is the same as the first embodiment, so an explanation thereof is omitted.

In the electric heating type catalyst 14 constructed in this manner, unburnt fuel (HC, CO, etc.) contained in an exhaust gas is oxidized to generate heat by the catalyst 70 formed on the inner peripheral surface 28B of the inner pipe 28. As a result of this, the temperature of the inner pipe 28 becomes higher, and hence the difference in temperature between an outer pipe 27 and the inner pipe 28 becomes larger. Accordingly, a thermal phoresis effect becomes more remarkable, so that it is possible to suppress electricity from flowing to a case 2. In addition, the PM adhered to the inner pipe 28 can be oxidized by heat and thereby removed. Moreover, the exhaust gas can also be purified by the catalyst 70. In this manner, the PM can be removed from the outer peripheral surface 28A of the inner pipe 28, so it is possible to suppress electricity from flowing to the case 2.

Seventh Embodiment

Figure 13:
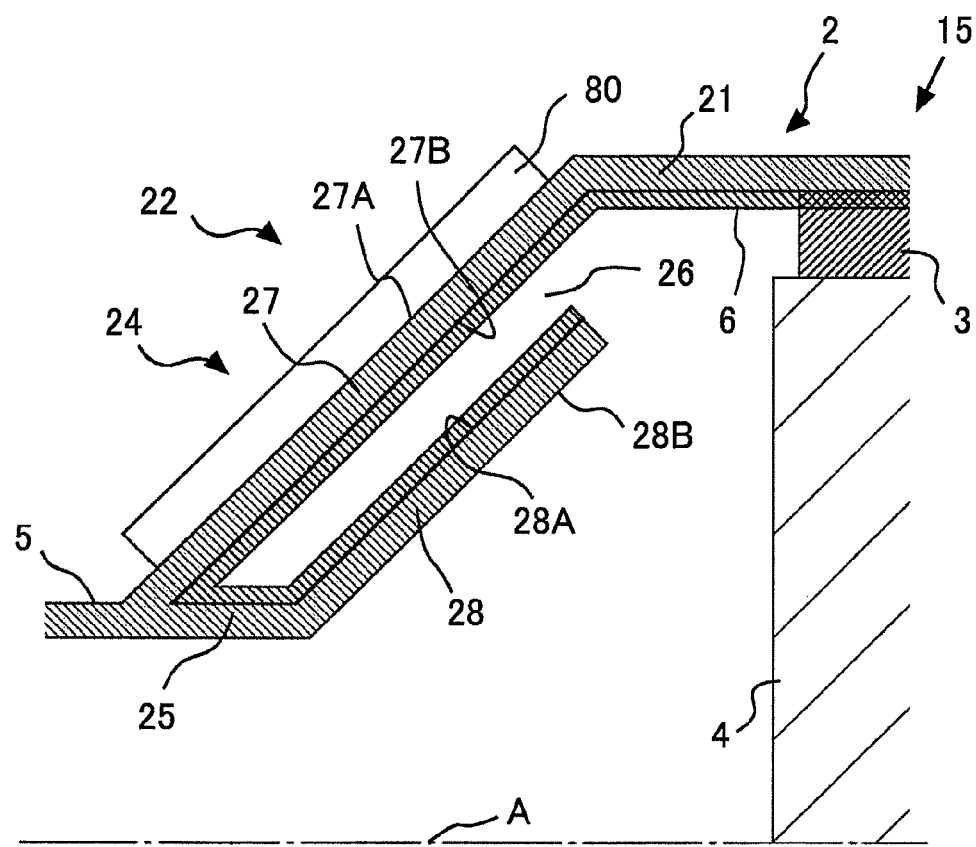
FIG. 13 is a view showing the schematic construction of an electric heating type catalyst according to a seventh embodiment of the present invention.

FIG. 13 is a view showing the schematic construction of an electric heating type catalyst 15 according to this sixth embodiment of the present invention. What is different from the electric heating type catalyst 1 shown in the first embodiment will be explained. In the electric heating type catalyst 15 shown in FIG. 13, a cooling device 80 is provided on an outer peripheral surface 27A of an outer pipe 27. This cooling device 80 need only be a device which takes heat from the outer peripheral surface 27A of the outer pipe 27. For example, the cooling device 80 can be a heat exchanger through which the cooling water of an internal combustion engine circulates. Also, the cooling device 80 may be cooling fins which protrude from the outer peripheral surface 27A of the outer pipe 27. That is, the contact area of the outer peripheral surface 27A of the outer pipe 27 with ambient air may be increased. Moreover, the cooling device 80 may be a blower for blowing air to the outer peripheral surface 27A of the outer pipe 27. In other respects, this seventh embodiment is the same as the first embodiment, so an explanation thereof is omitted.

In the electric heating type catalyst 15 constructed in this manner, the heat of the outer pipe 27 is taken by the cooling device 80, so the temperature of the outer pipe 27 falls. Accordingly, the difference in temperature between the outer pipe 27 and the inner pipe 28 becomes larger. As a result of this, a thermal phoresis effect becomes more remarkable, so that it is possible to suppress electricity from flowing to a case 2. In addition, when the outer peripheral surface 27A of the outer pipe 27 is cooled, the heat of the reception portion 21 is also taken by heat conduction. As a result, a mat 3 can be cooled. The mat 3 has an electric resistance which lowers as the temperature thereof becomes higher, so by cooling the mat 3, it is possible for the mat 3 to maintain its electric resistance at high value. For this reason, it is possible to suppress electricity from flowing to the case 2.

Eighth Embodiment

Figure 14:
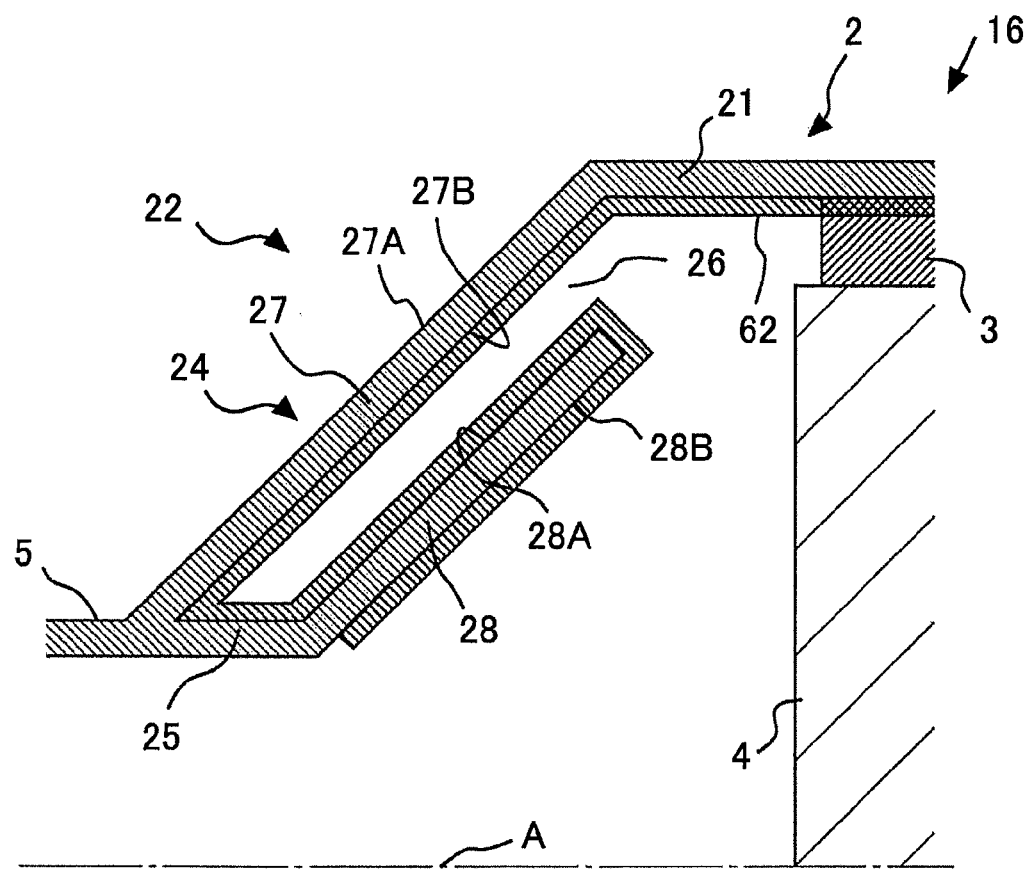
FIG. 14 is an enlarged view of a tapered portion according to the eighth embodiment.

FIG. 14 is an enlarged view of a tapered portion 22 according to this eighth embodiment. What is different from the electric heating type catalyst 1 shown in the first embodiment will be explained. In an electric heating type catalyst 16 shown in FIG. 14, an insulating layer 62 is formed also on an inner peripheral surface 28B of an inner pipe 28. In other respects, this eighth embodiment is the same as the first embodiment, so an explanation thereof is omitted.

The insulating layer 62 in this embodiment is formed on an inner peripheral surface 27B of an outer pipe 27 and an outer peripheral surface 28A of the inner pipe 28, and is further formed on the inner peripheral surface 28B of the inner pipe 28. Here, note that a closure portion 25 is a part of the inner pipe 28. That is, the insulating layer 62 is formed on the whole of the inner pipe 28. In addition, the insulating layer 62 is also formed to extend from a mat 3 to an open portion 26. That is, the insulating layer 62 is formed continuously from the mat 3 to a side of the inner peripheral surface 28B of the inner pipe 28 at the side of the closure portion 25 on the surface thereof.

In the electric heating type catalyst 16 constructed in this manner, similar to the first embodiment, it is possible to suppress electricity from flowing to the case 2, by means of a thermal phoresis effect. Here, note that there may be provided the plates 61 explained in the fifth embodiment. These plates 61 may be each covered with an insulating material.

As explained above, according to this embodiment, by forming the insulating layer 62 on the inner peripheral surface 28B of the inner pipe 28, too, it is possible to suppress PM from adhering to the inner pipe 28.

Ninth Embodiment

Figure 15:
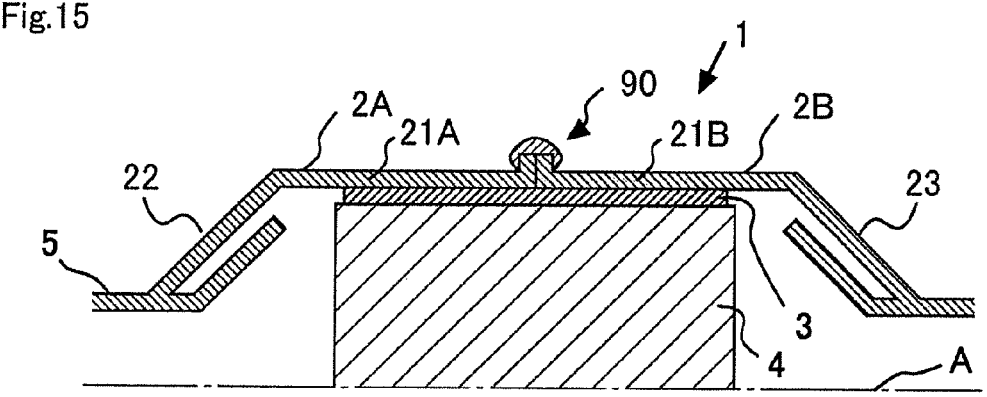
FIG. 15 is a view for explaining a manufacturing method of an electric heating type catalyst according to a ninth embodiment of the present invention.

In this ninth embodiment, reference will be made to a method for manufacturing the electric heating type catalyst 1 as explained in the first embodiment. Here, FIG. 15 is a view for explaining the manufacturing method of the electric heating type catalyst 1 according to this ninth embodiment of the present invention.

A case 2 is manufactured in such a manner that an upstream portion 2A at an upstream side of a central portion and a downstream portion 2B at a downstream side thereof in the direction of the flow of an exhaust gas are fabricated separately from each other. That is, a reception portion 21 is divided into an upstream side reception portion 21A and a downstream side reception portion 21B. The upstream portion 2A and the downstream portion 2B are arranged in the opposite directions with respect to each other, but are of the same shape. For this reason, in the following, an explanation will be given only to the shape of the upstream portion 2A. The other shapes in this embodiment are the same as those in the first embodiment.

First, the outer shape of the upstream portion 2A is formed from one pipe. That is, the reception portion 21A and the outer walls of a tapered portion 22 are formed. The outer wall of the tapered portion 22 is formed by spinning processing.

For this reason, there is no joint in the reception portion 21A and the outer walls of the tapered portion 22. An inner pipe 28 of a double pipe 24 is formed by spinning processing separately from the reception portion 21A and the outer walls of the tapered portion 22. Then, an upstream side end of the inner pipe 28 is welded to an upstream side end of the outer wall of the tapered portion 22 in a state where the inner pipe 28 is arranged at the inner side of the outer wall of the tapered portion 22. In this manner, the double pipe 24 is formed.

Thereafter, an insulating material is coated on those portions which are in contact with the exhaust gas in the case 2, thereby forming an insulating layer 6. Here, note that after this, the upstream portion 2A and the downstream portion 2B are welded to each other, but the insulating layer 6 is not formed in a place where such welding is carried out. In addition, it is not necessary to form the insulating layer 6 also in a place where a mat 3 is pushed on. In this manner, the upstream portion 2A and the downstream portion 2B are completed. Then, before welding the upstream portion 2A and the downstream portion 2B to each other, a catalyst carrier 4 and the mat 3 are placed inside the upstream portion 2A and the downstream portion 2B.

The catalyst carrier 4 is made to support a catalyst separately. In addition, electrodes are attached to the catalyst carrier 4. Then, the outer periphery of the catalyst carrier 4 is covered with the mat 3. Thereafter, one end of the catalyst carrier 4 is inserted into the inner side of the upstream portion 2A, and the other end thereof is inserted into the inner side of the downstream portion 2B, while compressing the mat 3. Here, note that the sizes of individual members are decided in such a manner that the catalyst carrier 4 is fixed to the inside of the case 2 by the expanding force of the mat 3.

Then, the upstream portion 2A and the downstream portion 2B are welded to each other. The parts to be welded are called a welded portion 90. Here, note that holes for passing the electrodes therethrough are formed to open at two locations in the parts of the upstream portion 2A and the downstream portion 2B in which they are joined to each other, and these parts are not welded. The upstream portion 2A and the downstream portion 2B may be provided with flanges, respectively, so as to make the welding thereof easy. In addition, the upstream portion 2A and the downstream portion 2B may be joined to each other by means of bolting or riveting, in place of welding. Here, note that in this embodiment, the welded portion 90 corresponds to a joined portion in the present invention.

Here, note that the insulating layer 6 is not formed in the welded portion 90 after welding. Here, the mat 3 is intimate contact with the welded portion 90, so the exhaust gas does not flow through the welded portion 90. For this reason, PM in the exhaust gas does not adhere to the welded portion 90. That is, electricity does not flow to the welded portion 90 even if the insulating layer 6 is not formed thereon.

Figure 16:
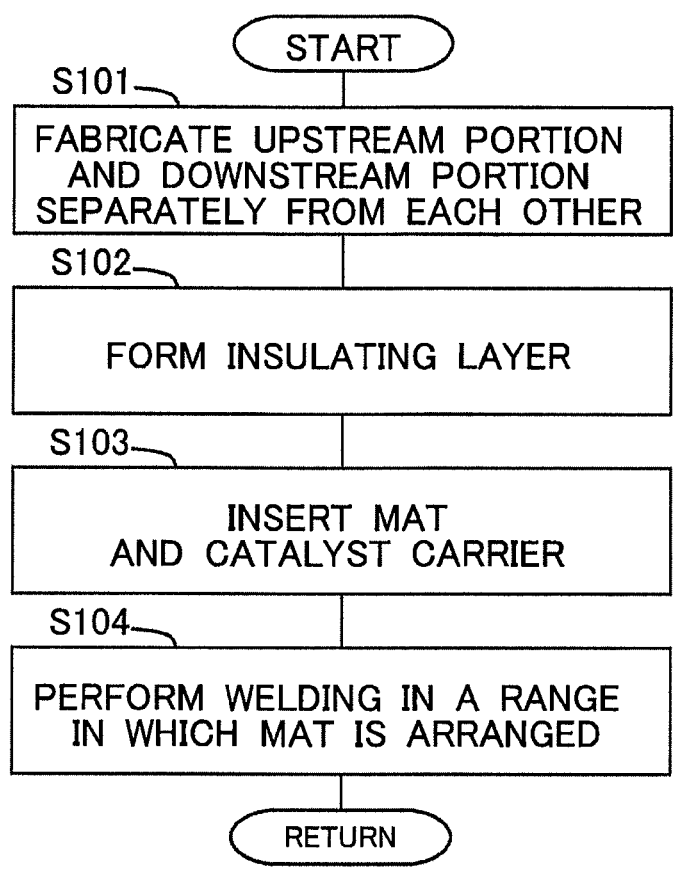
FIG. 16 is a flow chart showing a manufacturing flow of an electric heating type catalyst according to the ninth embodiment of the present invention.

FIG. 16 is a flow chart showing a manufacturing flow of an electric heating type catalyst according to this ninth embodiment of the present invention. In step S101, the upstream portion 2A and the downstream portion 2B are fabricated separately from each other. Also, in step S102, the insulating layer 6 is formed on the upstream portion 2A and the downstream portion 2B, respectively. In addition, in step S103, the mat 3 and the catalyst carrier 4 are inserted into the inner sides of the upstream portion 2A and the downstream portion 2B. Then, in step S104, the upstream portion 2A and the downstream portion 2B are welded to each other within the range in which the mat 3 is arranged.

Thus, by forming the welded portion 90 within the range in which the mat 3 is arranged, it is possible to suppress the flow of electricity from the welded portion 90 to the case 2 even if the insulating layer 6 is not formed on the welded portion 90. If the insulating layer 6 should be formed on all the places of the case 2 which require electrical insulation, a device for coating an insulating material in a precise manner will be needed, thereby resulting in an increase in cost. In addition, to coat the insulating layer 6 also takes time. Also, if the insulating material adheres to the catalyst carrier 4, an effective area of the catalyst will be decreased, and the performance of the catalyst will lower. In contrast to this, in this embodiment, it is not necessary to form the insulating layer 6 in the welded portion 90, so an increase in cost can be suppressed and the time required for manufacture can also be shortened. Moreover, a reduction in performance of the catalyst can be suppressed. Further, it is not necessary to form the insulating layer 6 in the surroundings of the welded portion 90 prior to welding thereof, so it is possible to suppress the insulating material from getting into the welded portion 90, thus making it possible to enhance the strength of the welded portion. Furthermore, because the insulating layer 6 is provided after the tapered portion 22 has been formed by means of spinning processing, the insulating layer 6 does not exfoliate at the time of spinning processing.

Tenth Embodiment

Figure 17:
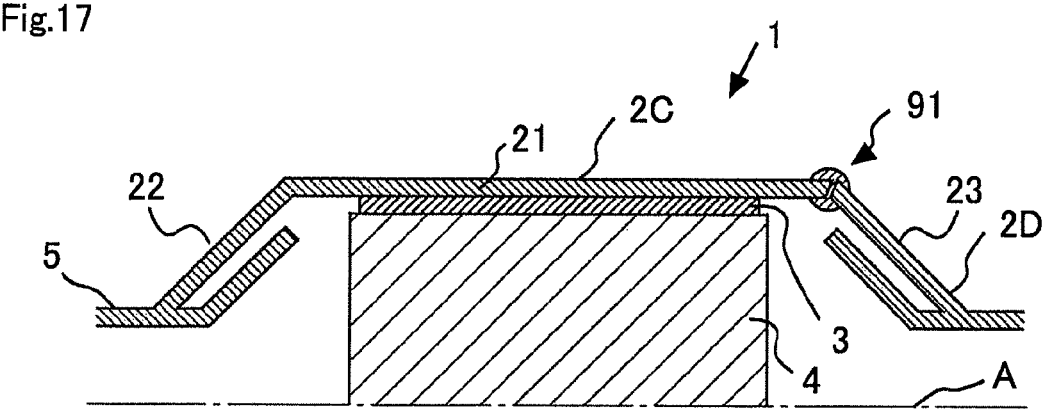
FIG. 17 is a view for explaining a manufacturing method of an electric heating type catalyst according to a tenth embodiment of the present invention.
Figure 18:
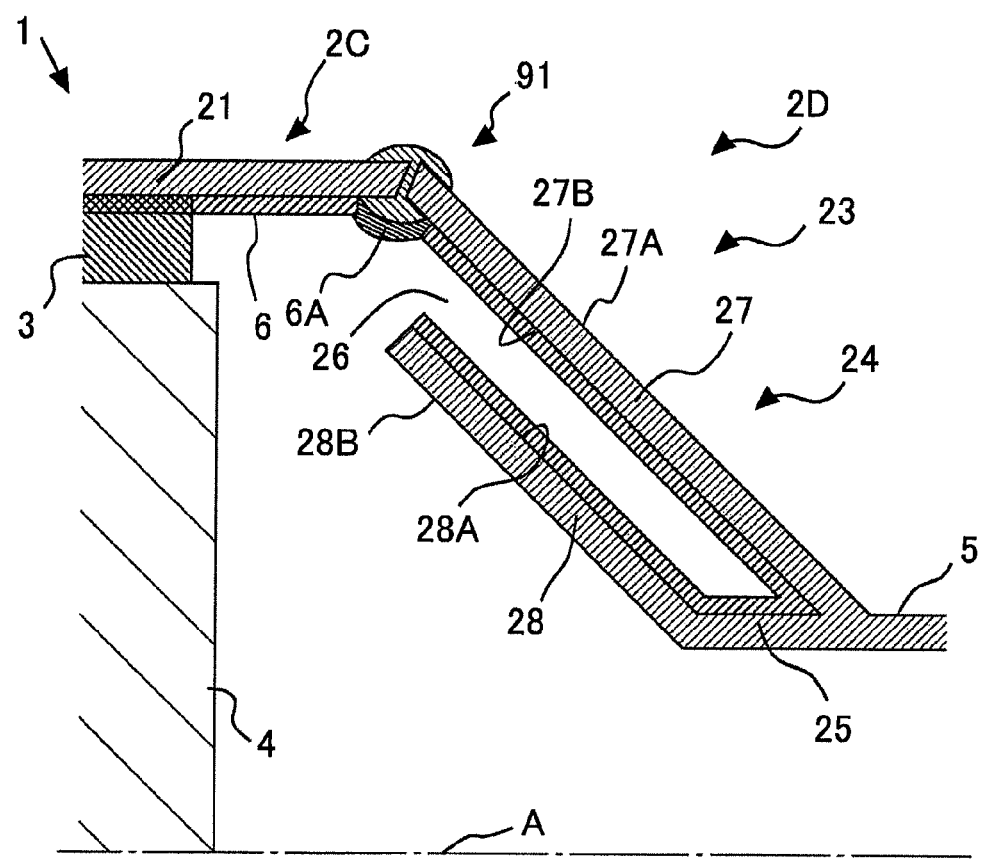
FIG. 18 is an enlarged view of a part in which a welded portion shown in FIG. 7 is provided.

In this tenth embodiment, reference will be made to a method for manufacturing the electric heating type catalyst 1 as explained in the first embodiment. Here, FIG. 17 is a view for explaining a manufacturing method for the electric heating type catalyst 1 according to this tenth embodiment of the present invention. In addition, FIG. 18 is an enlarged view of a part in which a welded portion 91 shown in FIG. 17 is provided. What is different from the ninth embodiment will be explained below.

In this embodiment, a case 2 is manufactured in such a manner that an upstream portion 2C at an upstream side of a boundary between a reception portion 21 and a downstream side tapered portion 23 and a downstream portion 2D at a downstream side of the boundary in the direction of the flow of an exhaust gas are fabricated separately from each other. That is, the boundary of the reception portion 21 and the downstream side tapered portion 23 becomes a welded portion 91. In other respects, this tenth embodiment is the same as the first embodiment.

First, the outer shape of the upstream portion 2C is formed from one pipe. That is, the reception portion 21 and the outer walls of a tapered portion 22 are formed. The outer wall of the tapered portion 22 is formed by spinning processing. For this reason, there is no joint in the reception portion 21 and the outer walls of the tapered portion 22. An inner pipe 28 of a double pipe 24 is formed by spinning processing separately from the reception portion 21 and the outer walls of the tapered portion 22. Then, an upstream side end of the inner pipe 28 is welded to an upstream side end of the outer wall of the tapered portion 22 in a state where the inner pipe 28 is arranged at the inner side of the outer wall of the tapered portion 22. In this manner, the double pipe 24 is formed. Thereafter, an insulating material is coated on those portions in the case 2 which are in contact with the exhaust gas, thereby forming an insulating layer 6. In addition, holes for passing electrodes therethrough are formed to open in the reception portion 21 at two locations.

In addition, the downstream side tapered portion 23 is formed by spinning processing, similar to the upstream side tapered portion 22. Then, an insulating material is coated on those parts of the upstream portion 2C and the downstream portion 2D which are in contact with the exhaust gas, thereby forming an insulating layer 6.

In this manner, the upstream portion 2C and the downstream portion 2D are completed. Then, before welding the upstream portion 2C and the downstream portion 2D to each other, a catalyst carrier 4 and a mat 3 are placed inside the upstream portion 2C.

Then, the upstream portion 2C and the downstream portion 2D are welded to each other. The parts to be welded become a welded portion 91. In this embodiment, after this welding, an insulating material is coated on the welded portion 91 from an inner side of the case 2, so that an insulating layer 6A is newly formed on the welded portion 91, too. That is, when PM adheres to the insulating layer 6, there is a possibility that electricity may flow from the catalyst carrier 4 to the welded portion 91. For this reason, the insulating layer 6A is newly formed. Here, note that in this embodiment, the welded portion 91 corresponds to a joined portion in the present invention.

Figure 19:
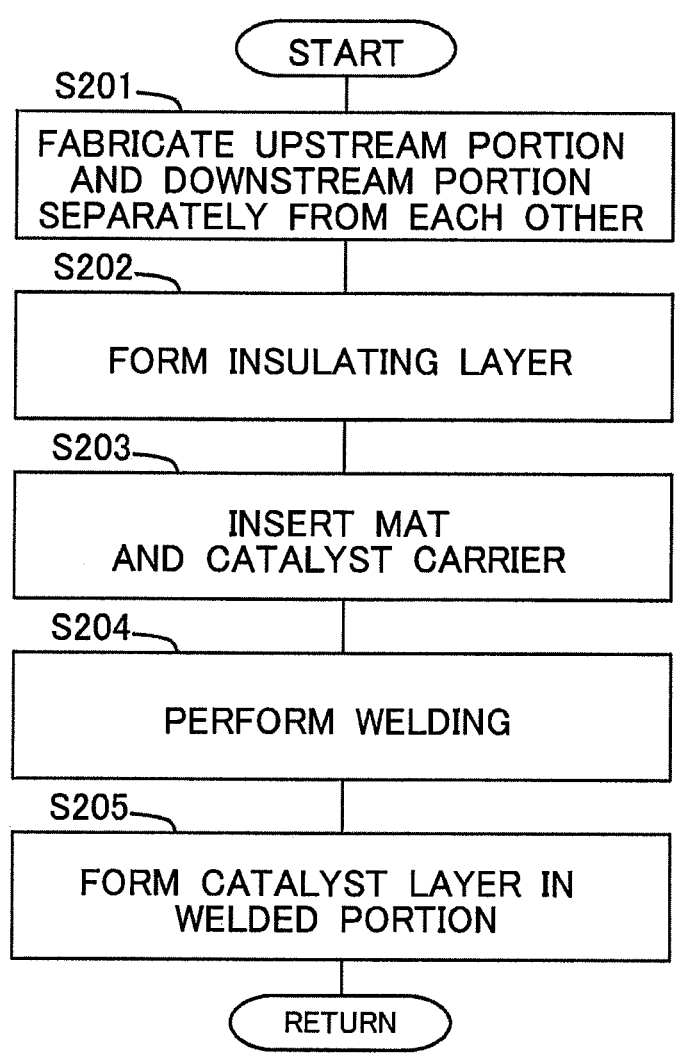
FIG. 19 is a flow chart showing a manufacturing flow of an electric heating type catalyst according to the tenth embodiment of the present invention.

FIG. 19 is a flow chart showing a manufacturing flow of the electric heating type catalyst 1 according to this tenth embodiment of the present invention. In step S201, the upstream portion 2C and the downstream portion 2D are fabricated separately from each other. Also, in step S202, the insulating layer 6 is formed on the upstream portion 2C and the downstream portion 2D, respectively. In addition, in step S203, the mat 3 and the catalyst carrier 4 are inserted into the inner side of the upstream portion 2C.

In step S204, a downstream end of the reception portion 21 and an upstream end of the tapered portion 23 are welded to each other. Also, in step S205, the insulating layer 6A is newly formed on the welded portion 91.

Here, the welded portion 91 is away from the double pipe, so the insulating material can be coated on the welded portion in a relatively easy manner. Thus, by newly forming the insulating layer 6A, it is possible to suppress electricity from flowing from the welded portion 91 to the case 2.

Here, note that in this embodiment, the boundary between the reception portion 21 and the downstream side tapered portion 23 is the welded portion 91, but in place of this, a boundary between the reception portion 21 and the upstream side tapered portion 22 may be made to be a welded portion. In addition, welded portions may be provided at two places, i.e., the boundary between the reception portion 21 and the downstream side tapered portion 23, and the boundary between the reception portion 21 and the upstream side tapered portion 22.

EXPLANATION OF REFERENCE NUMERALS AND CHARACTERS

1 Electric heating type catalyst
2 Case
3 Mat
4 Catalyst carrier
5 Exhaust pipe
6 Insulating layer
21 Reception portion
22 Tapered portion
23 Tapered portion
24 Double pipe
25 Closure portion
26 Open portion
27 Outer pipe
27A Outer peripheral surface of the outer pipe
27B Inner peripheral surface of the outer pipe 28 Inner pipe
28A Outer peripheral surface of the inner pipe
28B Inner peripheral surface of the inner pipe

The invention claimed is:

1. An electric heating type catalyst comprising:
a heat generation element that is electrically energized to generate heat;
a case that receives said heat generation element therein; and
a mat that is inserted between said heat generation element and said case for insulating electricity;
wherein
said case is formed into a double pipe at each of an upstream side and a downstream side of said heat generation element, respectively;
at the upstream side of said heat generation element, an inner pipe of said double pipe is in contact at a downstream side end thereof with an outer pipe of said double pipe, with a gap being formed between the inner pipe and the outer pipe of said double pipe at an upstream side end of the inner pipe, and
at the downstream side of said heat generation element, an inner pipe of said double pipe is in contact at an upstream side end thereof with an outer pipe of said double pipe, with a gap being formed between the inner pipe and the outer pipe of said double pipe at downstream side end of the inner pipe; and
an insulating layer for insulating electricity is provided on a surface of said case which extends from said mat to the other end of said inner pipe including a range surrounded by the outer pipe and the inner pipe of said double pipe.

2. The electric heating type catalyst as set forth in claim 1, wherein said double pipe is arranged in a tapered portion which has a passage cross sectional area for exhaust gas decreasing in accordance with an increasing distance from said heat generation element.

3. The electric heating type catalyst as set forth in claim 1, comprising: a plate that protrudes from a surface of the inner pipe of said double pipe directed to a central side of an exhaust passage.

4. The electric heating type catalyst as set forth in claim 1, comprising: a catalyst with an oxidation function provided on a surface of the inner pipe of said double pipe which is directed to a central side of an exhaust passage.

5. The electric heating type catalyst as set forth in claim 1, comprising: a cooling device that serves to cool the outer pipe of said double pipe.

6. The electric heating type catalyst as set forth in claim 1, wherein said case is formed by joining an upstream side portion and a downstream side portion to each other after the upstream side portion and the downstream side portion are formed separately from each other, and a joined portion at which the upstream side portion and the downstream side portion are joined to each other is provided within a range of said case in which said case is in contact with said mat.

7. The electric heating type catalyst as set forth in claim 1, wherein said case is formed by joining an upstream side portion and a downstream side portion to each other after the upstream side portion and the downstream side portion are formed separately from each other, and a joined portion at which the upstream side portion and the downstream side portion are joined to each other is provided in a place where a passage cross sectional area of a tapered portion, of which the passage cross sectional area for exhaust gas decreases in accordance with an increasing distance from said heat generation element, is the largest.

* * * * *